US009096171B2

(12) United States Patent
Kasaba et al.

(10) Patent No.: US 9,096,171 B2
(45) Date of Patent: Aug. 4, 2015

(54) VEHICLE LAMP CONTROLLER, VEHICLE LAMP SYSTEM, AND VEHICLE LAMP CONTROL METHOD

(75) Inventors: Yusuke Kasaba, Shizuoka (JP); Masashi Yamazaki, Shizuoka (JP); Atsushi Toda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 308 days.

(21) Appl. No.: 13/287,218

(22) Filed: Nov. 2, 2011

(65) Prior Publication Data
US 2012/0106179 A1 May 3, 2012

(30) Foreign Application Priority Data

Nov. 2, 2010 (JP) ................................. 2010-246105

(51) Int. Cl.
*B60Q 1/00* (2006.01)
*F21V 21/28* (2006.01)
*F21V 21/29* (2006.01)
*B60Q 1/115* (2006.01)

(52) U.S. Cl.
CPC .......... *B60Q 1/115* (2013.01); *B60Q 2300/114* (2013.01); *B60Q 2300/132* (2013.01)

(58) Field of Classification Search
CPC .......... B60Q 2300/14; B60Q 2300/33; B60Q 2300/114; B60Q 2300/132; B60Q 1/115; B60T 8/172
USPC .............................. 362/464, 465, 466; 701/49
See application file for complete search history.

(56) References Cited

U.S. PATENT DOCUMENTS

| 6,193,398 | B1 * | 2/2001 | Okuchi et al. | 362/466 |
| 6,229,263 | B1 * | 5/2001 | Izawa | 315/80 |
| 6,278,912 | B1 * | 8/2001 | Amano | 701/1 |
| 6,430,521 | B1 * | 8/2002 | Toda | 702/150 |
| 6,805,472 | B2 * | 10/2004 | Fukawa | 362/466 |
| 2004/0125608 | A1 * | 7/2004 | Izawa | 362/464 |

FOREIGN PATENT DOCUMENTS

| JP | 2000-085459 A | 3/2000 |
| JP | 2001-341578 A | 12/2001 |
| JP | 2004-314856 A | 11/2004 |
| JP | 2009-126268 A | 6/2009 |

* cited by examiner

*Primary Examiner* — Jong-Suk (James) Lee
*Assistant Examiner* — Tsion Tumebo
(74) *Attorney, Agent, or Firm* — Sughrue Mion, PLLC

(57) ABSTRACT

A vehicle lamp controller, a vehicle lamp system having the vehicle controller, and a vehicle lamp control method are provided. The vehicle lamp controller includes a receiver configured to receive information on a detected vector from an output of an acceleration sensor, a memory in which a plurality of reference vectors are stored, the reference vectors corresponding to different pitch angles of a vehicle, a control unit configured to obtain a pitch angle of the vehicle from the detected vector and one of the reference vectors that has a smallest angle with respect to the detected vector, and to generate a control signal for adjusting an optical axis of a vehicle lamp based on the obtained pitch angle, and a transmitter configured to transmit the control signal to an optical axis adjustment portion of the vehicle lamp.

7 Claims, 4 Drawing Sheets

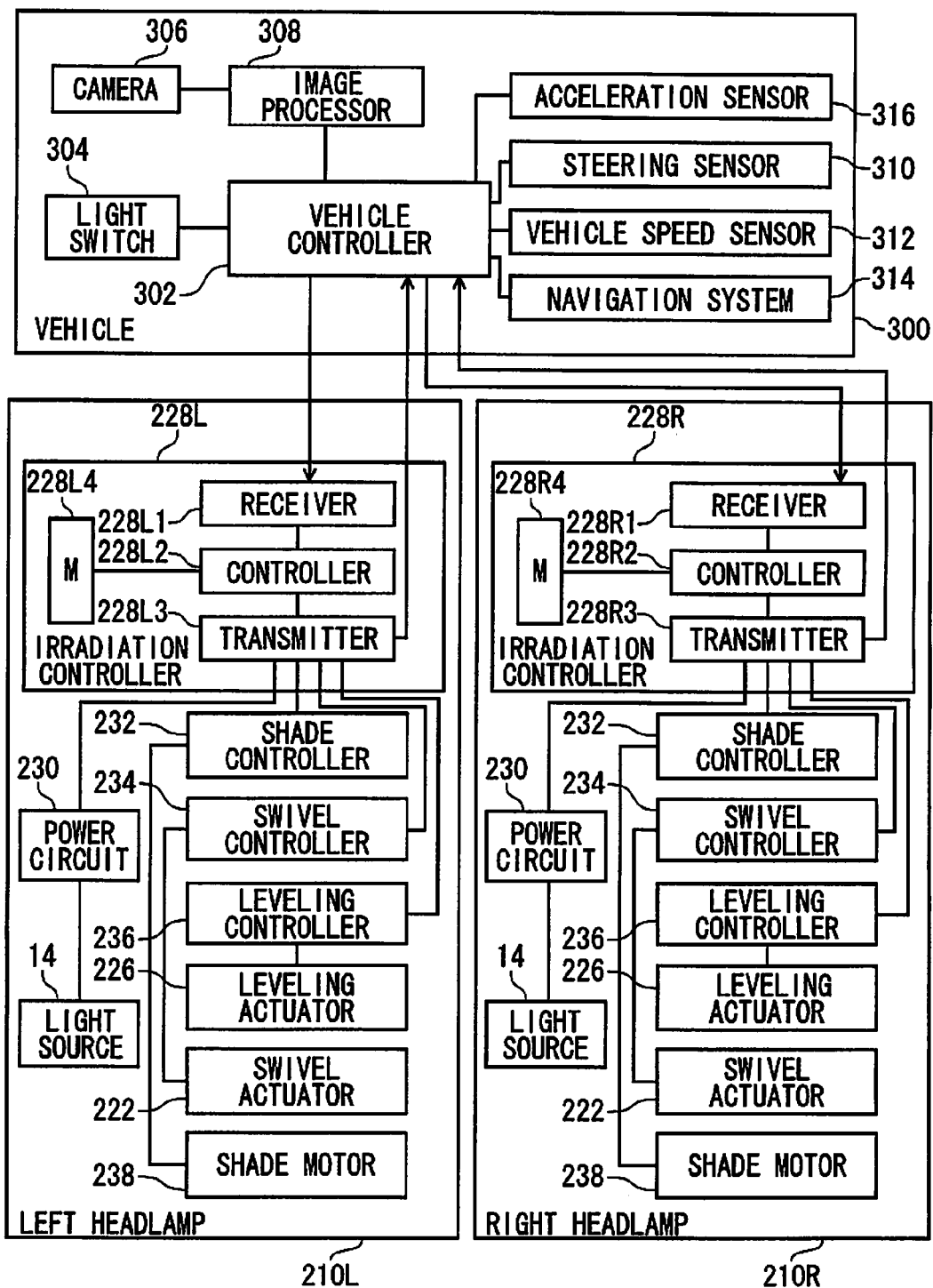

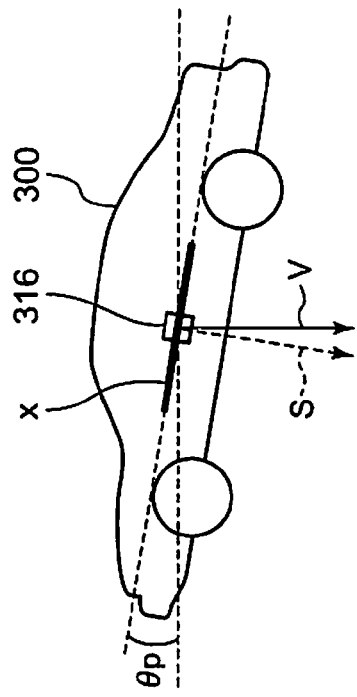
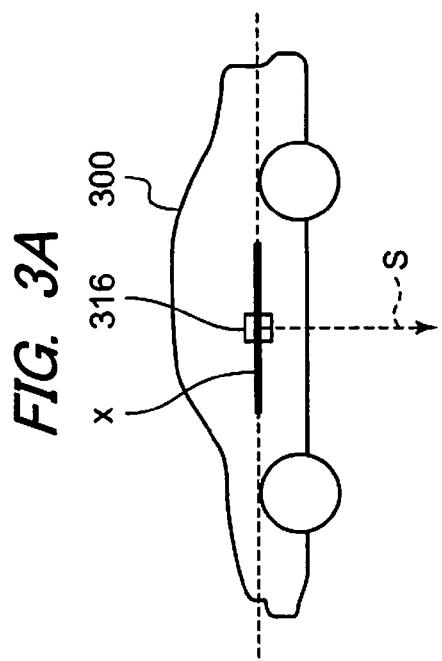
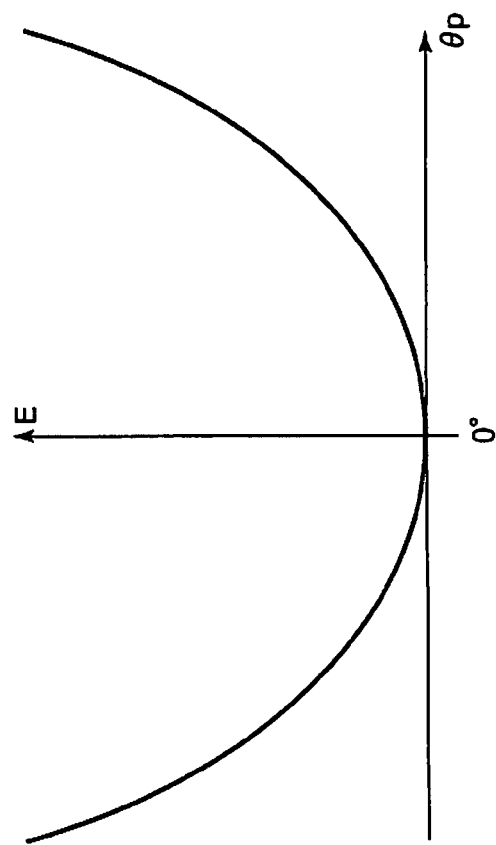

VEHICLE LAMP CONTROLLER, VEHICLE LAMP SYSTEM, AND VEHICLE LAMP CONTROL METHOD

The present application claims priority from Japanese Patent Application No. 2010-246105 filed on Nov. 2, 2010, the entire content of which is incorporated herein by reference.

FIELD OF INVENTION

The present invention relates to a vehicle lamp controller, a vehicle lamp system, and a vehicle lamp control method.

DESCRIPTION OF RELATED ART

In an auto-leveling control, a position of an optical axis of a vehicle headlamp is automatically adjusted in accordance with an inclination angle of a vehicle in the pitch direction to change the irradiating direction of the headlamp. Generally, in the auto-leveling control, a vehicle height sensor is used as a vehicle inclination detection device, and the optical axis position of the headlamp is adjusted in accordance with the pitch angle of the vehicle detected by the vehicle height sensor. According to other related art, the inclination detection device may include a gravity sensor (see, e.g., JP 2000-085459 A), a three-dimensional gyro sensor for detecting the inclination angle of the vehicle with respect to a horizontal plane (see, e.g., JP 2004-314856 A), an inclinometer for detecting the inclination angle of the vehicle with respect to the gravitational direction of the vehicle (see, e.g., JP 2001-341578 A), or an acceleration sensor for detecting the gravity acceleration of the vehicle (see, e.g., JP 2009-126268 A).

By using an acceleration sensor such as a gravity sensor or a three-dimensional gyro sensor as a vehicle inclination detection device, as compared with a vehicle height sensor, an auto-leveling system can be provided at low cost and in a weight saving manner.

BRIEF SUMMARY

Illustrative aspects of the present invention provide a technology which can improve accuracy of an auto-leveling control that uses an acceleration sensor.

According to an illustrative aspect of the present invention, a vehicle lamp controller is provided. The vehicle lamp controller includes a receiver configured to receive information on a detected vector from an output of an acceleration sensor, a memory in which a plurality of reference vectors are stored, the reference vectors corresponding to different pitch angles of a vehicle, a control unit configured to obtain a pitch angle of the vehicle from the detected vector and one of the reference vectors that has a smallest angle with respect to the detected vector, and to generate a control signal for adjusting an optical axis of a vehicle lamp based on the obtained pitch angle, and a transmitter configured to transmit the control signal to an optical axis adjustment portion of the vehicle lamp.

According to another illustrative aspect of the present invention, a vehicle lamp system is provided. The vehicle lamp system includes a vehicle lamp having an adjustable optical axis, an acceleration sensor, and the vehicle lamp controller described above.

According to yet another illustrative aspect of the present invention, a vehicle lamp control method is provided. The method includes receiving information on a detected vector from an output of the acceleration sensor, referring to a plurality of reference vectors corresponding to different pitch angles of a vehicle, obtaining a pitch angle of the vehicle from the detected vector and one of the reference vectors that has a smallest angle with respect to the detected vector; and adjusting an optical axis of a vehicle lamp based on the obtained pitch angle.

Other aspects and advantages of the invention will be apparent from the following description, the drawings and the claims.

BRIEF DESCRIPTION OF THE DRAWINGS

FIG. 2 is a functional block diagram illustrating operation linkage between an irradiation controller of a headlamp and a vehicle controller of a vehicle;

FIGS. 3A to 3C are diagrams illustrating an example of an auto-leveling control is that uses a single reference vector.

DETAILED DESCRIPTION

Hereinafter, exemplary embodiments of the present invention will be described in detail with reference to the drawings. However, the following exemplary embodiments do not limit the scope of the claimed invention.

Figure 1:
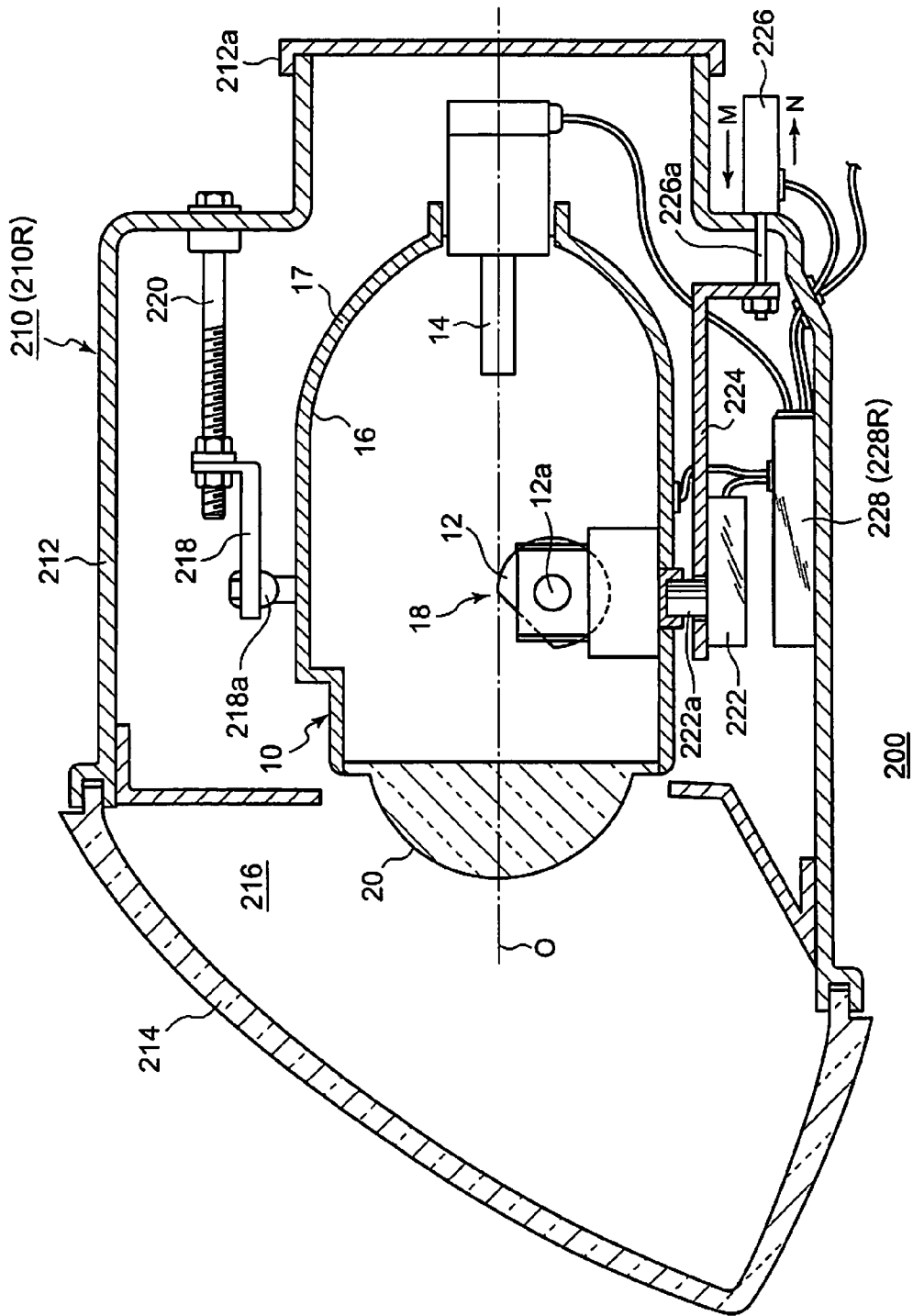
FIG. 1 is a vertical sectional view of a vehicle lamp system according to an exemplary embodiment of the invention.

FIG. 1 shows a vehicle lamp system 200 according to an exemplary embodiment of the present invention. The vehicle lamp system 200 is a light distribution variable headlamp system including a pair of right and left symmetrically configured headlamps disposed apiece on the right and left of a vehicle in the vehicle width direction. Because the right and left headlamps are substantially the same in structure except that they are bilaterally symmetric, description will be given herein below of the structure of the right headlamp 210R, and thus the description of the left headlamp will be omitted. When the components of the left headlamp are discussed, for convenience of description, they are given the same reference signs as the corresponding components of the headlamp 210R.

The headlamp 210R includes a lamp body 212 having a front opening and a transparent cover 214 covering the front opening of the lamp body 212. The lamp body 212 includes a removable cover 212a on a back side thereof. The removable cover 212a is removed, for example, when replacing a light source 14. The lamp body 212 and transparent cover 214 together form a lamp chamber 216. In the lamp chamber 216, a lamp unit 10 (an example of a vehicle lamp) is accommodated to irradiate a region ahead of a vehicle with light.

The lamp unit 10 has a lamp bracket 218 having a pivot mechanism 218a serving as the center of pivot of the lamp unit 10 in up-down and right-left directions. The lamp bracket 218 is threadedly engaged with an aiming adjustment screw 220 which is rotatably supported on the wall of the lamp body 212. Therefore, the lamp unit 10 can be installed at a given position inside the lamp chamber 216 by the adjustment of the aiming adjustment screw 220 and, with the given position being a reference, the orientation of the lamp unit 10 can be changed between a forwardly inclined orientation and a rearwardly inclined orientation about the pivot mechanism 218a. Also, a rotation shaft 222a of a swivel actuator 222 is attached to the lower portion of the lamp unit 10 to irradiate a region toward which the vehicle is turning when running on a curved road. The swivel actuator 222 is fixed to a unit bracket 224.

A leveling actuator 226 is disposed outside the lamp body 212 and is connected to the unit bracket 224. The leveling actuator 226 may be a motor or the like having a rod 226a that can project and retract in the directions M, N shown in FIG. 1. When the rod 226a projects in the direction M, the lamp unit 10 is tilted about the pivot mechanism 218a to be in the rearwardly inclined orientation. When the rod 226a retracts in the direction N, the lamp unit 10 is tilted about the pivot mechanism 218a to be in the forwardly inclined orientation. When the lamp unit 10 is tilted to be in the rearwardly inclined orientation, the pitch angle of an optical axis O, i.e. the up-down direction angle of the optical axis O is adjusted to face upward. When the lamp unit 10 is tilted to be in the rearwardly inclined orientation, the pitch angle of the optical axis O is adjusted to face downward.

On the inner wall surface of the lamp chamber 216 below the lamp unit 10, an irradiation controller 228 (an example of a vehicle lamp controller) is provided to turn on/off the light, to control a light distribution pattern formation, and to adjust the optical axis of the lamp unit 10. FIG. 1 shows the irradiation controller 228R for controlling the headlamp 210R. This irradiation controller 228R also controls the swivel actuator 222, leveling actuator 226 and the like. The irradiation controller 228R may be disposed outside the headlamp 210R.

The lamp unit 10 may also include an aiming adjustment mechanism. For example, in the connecting portion between the rod 226a of the leveling actuator 226 and the unit bracket 224, an aiming pivot mechanism (not shown) may be disposed to provide the center of pivot in the aiming adjustment. Also, on the lamp bracket 218, two aiming adjustment screws 220 may be provided such that they are spaced from each other in the vehicle width direction. In this configuration, by rotating the two aiming adjustment screws 220, the lamp unit 10 can be rotated in the up-down and right-left directions about the aiming pivot mechanism to adjust the optical axis O in the up-down and right-left directions. This aiming adjustment is carried out, for example, before shipping the vehicle, during the vehicle inspection, or when replacing the headlamp 210R. The headlamp 210R is adjusted to be in a given orientation as designed and, with this orientation being a reference, the light distribution pattern formation control and the optical axis position adjustment control are carried out.

The lamp unit 10 includes a shade mechanism 18 including a rotary shade 12, the light source 14, a lamp housing 17 having a reflector 16 on the inner surface thereof, and a projection lens 20. The light source 14 may be an incandescent lamp, a halogen lamp, a discharge lamp, an LED or the like. In this exemplary embodiment, the light source 14 is a halogen lamp. The reflector 16 reflects light emitted from the light source 14. The light from the light source 14 and the light reflected by the reflector 16 are partially guided through the rotary shade 12 toward the projection lens 20. The rotary shade 12 is a cylindrical member which is rotatable about a rotation shaft 12a, and includes a cutout portion extending in the axial direction and a plurality of shade plates (not shown). The cutout portion or one of the shade plates is moved to the optical axis O form a respective light distribution pattern. At least a portion of the reflector 16 has an ellipsoidal shape, including an elliptic sectional shape along the optical axis O of the lamp unit 10. The ellipsoidal portion of the reflector 16 has a first focal point substantially in the center of the light source 14 and a second focal point on the rear focal plane of the projection lens 20.

The projection lens 20 is disposed on the optical axis O extending in the front-rear direction of the vehicle. The light source 14 is behind the rear focal plane including the rear focal point of the projection lens 20. The projection lens 20 is a plano-convex aspherical lens having a convex front surface and a flat rear surface, and projects a light source image formed on the rear focal plane on a virtual vertical screen ahead of the vehicle lamp system 200 as an inverted image. The lamp unit 10 is not limited to the configuration described above, and may be, for example, a reflector-type lamp unit which does not have the projection lens 20.

FIG. 2 is a functional block diagram illustrating operation linkage between the irradiation controller of the headlamp having the configuration described above and a vehicle controller of a vehicle. As described above, since the right headlamp 210R and left headlamp 210L are the same in structure, only the headlamp 210R will be described, and the description of the headlamp 210L will be omitted.

The irradiation controller 228R of the headlamp 210R includes a receiver 228R1, a control unit 228R2, a transmitter 228R3, and a memory 228R4. The irradiation controller 228R controls a power circuit 230 to perform lighting control of the light source 14, based information obtained from a vehicle controller 302 in a vehicle 300. Also, the irradiation controller 228R controls a shade controller 232, a swivel controller 234 and a leveling controller 236 (an example of an optical axis adjustment portion) in accordance with information obtained from the vehicle controller 302. Various kinds of information transmitted from the vehicle controller 302 including vector information output from an acceleration sensor 316 are received by the receiver 228R1. The control unit 228R2 generates various control signals, based on the information received by the receiver 228R1, and sometimes together with information stored in a memory 228R4. These control signals are transmitted by the transmitter 228R3 to the power circuit 230 of the lamp unit 10, the shade controller 232, the swivel controller 234, the leveling controller 236 and the like. The memory 228R4 may be, for example, a non-volatile memory.

The shade controller 232 controls and rotates a motor 238 connected to the rotation shaft 12a of the rotary shade 12 to move a desired shade plate or the cutout portion onto the optical axis O. The swivel controller 234 controls the swivel actuator 222 to adjust the angle of the optical axis O of the lamp unit 10 with respect to the vehicle width direction (the right-left direction). Specifically, when a vehicle is turning, for example, running on a curved road or cornering to the right or to the left, the optical axis O of the lamp unit 10 is directed in a direction where the vehicle is heading. The leveling controller 236 controls the leveling actuator 226 to adjust the optical axis O of the lamp unit 10 with respect to the vehicle vertical direction (a pitch angle direction). For example, the orientation of the lamp unit 10 is adjusted in accordance with the forwardly or backwardly inclined orientation of the vehicle caused by, for example, increase or decrease of a carrying load or the number of occupants, thereby adjusting the reaching range of the forward irradiation light to an optimum distance. The vehicle controller 302 supplies similar information to the headlamp 210L as well, and the irradiation controller 228L (a vehicle lamp controller) of the headlamp 210L executes similar control to the irradiation controller 228R.

Light distribution patterns to be formed by the headlamps 210L, 210R can be switched by the driver operating the light switch 304. That is, in accordance with the operation of the light switch 304, the irradiation controller 228L, 228R control the motor 238 through the shade controller 232 to decide the light distribution pattern to be formed by the lamp unit 10. Alternatively, the headlamps 210L, 210R may be automatically controlled to form the optimum light distribution pattern without the operation of the light switch 304, by detecting the condition of the vehicle 300 or conditions surrounding the vehicle using various sensors. This light distribution pattern automatic formation control is carried out, for example, when the light distribution pattern automatic formation control is instructed by the light switch 304.

In order to detect a target object such as a preceding vehicle or an oncoming vehicle, a camera 306 such as a stereo camera is connected to the vehicle controller 302. The image processor 308 executes a given image processing such as a target object recognition processing on image frame data obtained by the camera 306, and the recognition results are supplied to the vehicle controller 302. Also, the vehicle controller 302 is capable of obtaining information supplied from a steering sensor 310, a vehicle speed sensor 312, a navigation system 314, an acceleration sensor 316 and the like on the vehicle 300. Thus, in accordance with the running condition and orientation of the vehicle 300, the irradiation control units 228L, 228R can select the light distribution pattern to be formed and can change the direction of the optical axis O.

Next, description will be given below specifically of the auto leveling control that is carried out by the vehicle lamp system 200 having the configuration described above. Since the control to be executed by the irradiation controller 228L and the control to be executed by the irradiation portion 228R are basically the same, description will be given here only of the control of the irradiation portion 228R, and the description of the irradiation controller 228L will be omitted.

Figure 4A:
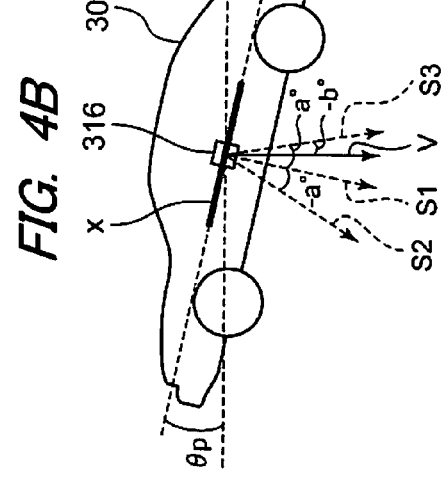
FIGS. 4A to 4C are diagram illustrating an example of an auto-leveling control that uses a plurality of reference vectors.
Figure 4B:
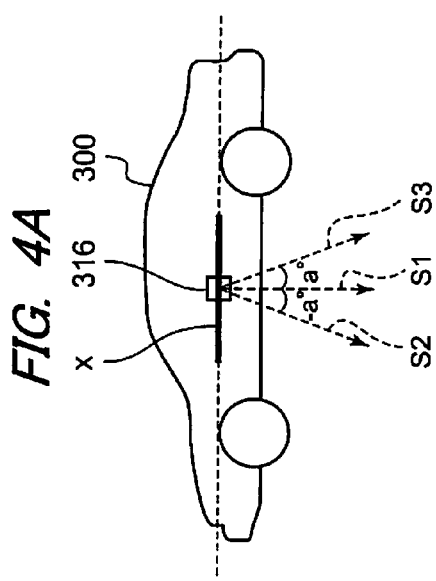
Figure 4C:
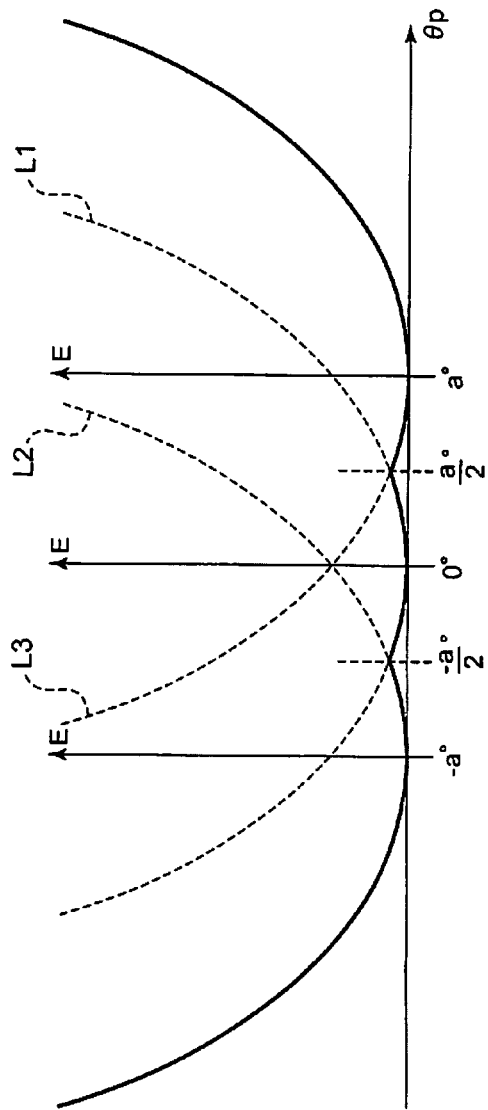

FIGS. 3A to 3C are diagrams illustrating an example of an auto leveling control that uses a single reference vector. FIGS. 4A to 4C are diagrams illustrating an example of an auto leveling control that uses a plurality of reference vectors. FIGS. 3A and 4A show a state in which the inclination angle $\theta p$ of the vehicle 300 in the pitch direction has not changed. FIGS. 3B and 4B show a state in which the inclination angle $\theta p$ of the vehicle 300 in the pitch direction has changed. FIGS. 3C and 4C are graphs showing a relationship between the inclination angle $\theta p$ of the vehicle 300 and an error E between the derived inclination angle and the actual inclination angle.

For example, when a baggage is carried in the baggage room of the rear portion of the vehicle or when an occupant sits on the rear seat, the vehicle takes the rearwardly inclined orientation, When the baggage is removed or when the occupant gets off the vehicle, the vehicle inclines toward the forward from the rearwardly inclined orientation. The irradiation direction of the lamp unit 10 also varies in accordance with the change of the orientation of the vehicle 300, and the forward irradiation range increases or decreases accordingly. The irradiation control unit 228R receives information on a vector from an output from the acceleration sensor 316 through the vehicle controller 302, derives the inclination angle $\theta p$ of the vehicle 300 in the pitch direction, i.e the pitch angle $\theta p$ of the vehicle 300 from the vector, controls the leveling actuator 226 through the leveling controller 236 to adjust the pitch angle of the optical axis O to an angle corresponding to the vehicle orientation. By carrying out the auto leveling control in this manner, a real-time leveling adjustment of the lamp unit 10 is carried out in accordance with the condition of the vehicle. Thus, even when the vehicle orientation changes due to the state of use of the vehicle 300, the reaching range of the forward irradiation can be adjusted to be the optimum range.

The acceleration sensor 316 is, for example, a three-axis acceleration sensor having an X axis, a Y axis and a Z axis which are perpendicular to each other. The acceleration sensor 316 is mounted on the vehicle 300 in such a manner that the X axis extends along the longitudinal axis of the vehicle 300, the Y axis extends along the lateral axis of the vehicle 300 and the Z axis extends along the vertical axis of the vehicle 300 respectively. The acceleration sensor 316 detects the inclination of the vehicle 300 with respect to the gravity acceleration vector, and outputs the numerical values of the respective axis components of the gravity acceleration vector in the three axis directions.

Generally, the acceleration sensor 316 has variations in the sensor sensitivity and sensor offset and, therefore, depending on the orientation of the acceleration sensor or on the vehicle orientation, it can output different detection values with respect to the same acceleration. Consequently, depending on the orientation of the acceleration sensor or on the vehicle orientation, there is a difference between the inclination angle $\theta p$ of the vehicle 300 derived from the vector detected by the acceleration sensor 316 and the actual inclination angle $\theta p$ of the vehicle 300.

According to a comparison example of the auto leveling, as shown in FIG. 3A, firstly, a vector obtained from the acceleration sensor 316 when the vehicle 300 is in a reference state, i.e. the vehicle 300 being placed on the horizontal plane, is stored as a single reference vector S. As shown in FIG. 3B, when the inclination angle $\theta p$ of the vehicle 300 changes, the inclination angle $\theta p$ of the vehicle 300 is derived from the vector V output from the acceleration sensor 316 and the reference vector S. Specifically, an angle formed between the vector V and reference vector S provides the inclination angle $\theta p$ of the vehicle 300. Based on this derived vehicle inclination angle $\theta p$, the optical axis adjustment is carried out.

However, as described above, the acceleration sensor 316 has variations in the sensor sensitivity and sensor offset. Therefore, as shown in FIG. 3C, the acceleration sensor 31 has a sensor characteristic that, as the deviation of the current inclination angle $\theta p$ of the vehicle 300 from the inclination angle of 0° in the reference state increases, that is, as the difference between the reference inclination angle $\theta p$ and the actual inclination angle $\theta p$ increases, the error E between the inclination angle derived using the reference vector S and the actual inclination angle increases. Therefore, in the auto leveling control of the comparison example, as a variation in the inclination of the vehicle 300 from the reference condition increases, the adjustment accuracy of the optical axis position is lowered accordingly.

On the other hand, according to the vehicle lamp system 200 of the exemplary embodiment, an auto leveling control is carried out such that, among the plurality of reference vectors that should be output from the acceleration sensor 316 when the vehicle 300 takes corresponding orientations having different pitch angles respectively, the reference vector having the smallest angle with respect to the vector currently being output from the acceleration sensor 316 is used to obtain the inclination angle $\theta p$ of the vehicle from the vector currently being output from the acceleration sensor 316 and, based on the obtained inclination angle $\theta p$, the optical axis O of the lamp unit 10 is adjusted.

Specifically, firstly, for example, in a manufacturing factory of a vehicle manufacturer or in a repair shop of a dealer, as shown in FIG. 4A, the vehicle 300 is set on a horizontal plane, which provides a first reference state. Through the switch operation of the initialization processing device of the factory or through the communication of a CAN (Controller Area Network) to which the irradiation controller 228R and acceleration sensor 316 are connected via the vehicle controller 302, an initialization signal is transmitted to the irradiation controller 228R. The initialization signal transmitted to the irradiation controller 228R is received by the receiver 228R1 and sent to the control unit 228R2. Upon receiving the initialization signal, the control unit 228R2 stores the vector information output from the acceleration sensor 316 in the first reference state in the memory 228R4 as a first reference vector S1. An initial aiming adjustment using the first reference vector S1 may be carried out at this point.

Next, the pitch angle of the vehicle 300 is changed from the first reference state. The control unit 228R2 stores information on vectors, that are output from the acceleration sensor 316 in various orientations having different pitch angles from the first reference state, in the memory 228R4 as the second to the n-th reference vectors respectively. For example, the pitch angle of the vehicle 300 is changed such that the plurality of reference vectors include information on vectors to be output from the acceleration sensor 316 when the vehicle is set in the horizontal orientation, inclined in the elevation angle direction from the horizontal orientation, and inclined in the depression angle direction from the horizontal state. Specifically, the pitch angle of the vehicle 300 in the first reference state is changed in the depression angle direction by a given angle of $-a°$, thereby setting the vehicle 300 in a second reference state, and the vector is stored in the memory 228R4 as a second reference vector S2 Likewise, the pitch angle of the vehicle 300 in the first reference state is changed in the elevation angle direction by a given angle of $a°$, thereby setting the vehicle 300 in a third reference state, and the vector is stored into the memory 228R4 as a third reference vector S3.

In this manner, a plurality of reference vectors are stored in the memory 228R4, the reference vectors including vectors that are respectively output when the vehicle is in the first reference state where the vehicle 300 is set in a horizontal state, the second reference state where the vehicle 300 is inclined in the elevation angle direction from the first reference state, and in the third reference state where the vehicle 300 is inclined in the depression angle direction from the first reference state. This makes it possible to reliably improve accuracy of the auto leveling control in the range of inclination angles that the vehicle 300 would possibly take frequently. Here, the number of reference vectors to be stored and the angle range between the reference vectors are not limited to the examples described above. For example, the range of the inclination angle $θp$ of the vehicle 300 is assumed to be $±5°$ and, in this range, a plurality of reference vectors can be stored. In this exemplary embodiment, the inclination angle $θp$ of the vehicle 300 mounted with the acceleration sensor 316 is changed when recording the plurality of reference vectors. However, the inclination angle of a lamp assembly incorporating the acceleration sensor 316 or the inclination angle of the acceleration sensor 316 alone may be changed to record a plurality of reference vectors. When the vehicle 300 is inclined, the reference vectors can be obtained more accurately than when the lamp assembly or the acceleration sensor 316 alone is inclined. On the other hand, when the lamp assembly or the acceleration sensor 316 alone is inclined, the reference vectors can be obtained more simply than when the vehicle 300 is inclined. The plurality reference vectors can also be obtained by calculation without inclining the vehicle 300, the lamp assembly, or the sensor alone.

In this manner, the irradiation controller 228R obtains the plurality of reference vectors to be output from the acceleration sensor 316 when the vehicle 300 takes orientations having different pitch angles in advance. As shown in FIG. 4B, when, while the vehicle 300 is in actual use, a vector V corresponding to the current inclination angle $θp$ of the vehicle 300 is output from the acceleration sensor 316, the control unit 228R2, using one of the plurality of reference vectors that has the smallest angle with respect to the vector V being output from the acceleration sensor 316, derives the inclination angle $θp$ of the vehicle from the vector V currently output from the acceleration sensor 316.

For example, the control unit 228R2 calculates the angles of all of the first to third reference vectors S1, S2, S3 with respect to the vector V, and selects the reference vector having the smallest one of the calculated angles. Then, the control unit 228R2 derives, as the inclination angle $θp$ of the vehicle 300, a sum of an angle between the selected one of the reference vectors S1, S2, S3 and the vector V output from the acceleration sensor 316 and the inclination angle of the vehicle 300 in the reference state corresponding to the selected one of the reference vectors S1, S2, S3. Then, based on the derived vehicle inclination angle $θp$, the control unit 228R2 generates a control signal for instructing the optical axis adjustment of the lamp unit 10. In FIG. 4B, the third reference vector S3 is selected and a control signal is generated based on an angle $(a-b°)$ which is a sum of an angle $-b°$ between the third reference vector S3 and the vector V and an inclination angle $a°$ of the vehicle 300 in the third reference state corresponding to the third reference vector S3.

Alternatively, the control unit 228R may firstly calculate a provisional inclination angle of the vehicle 300 from the vector V using the first reference vector S1. In this case, the control unit 228R selects a reference vector in which the inclination angle of the vehicle 300 in the corresponding reference state is closest to the calculated provisional inclination angle, and generates a control signal for instructing the optical axis adjustment.

The generated control signal is transmitted to the leveling controller 236 by the transmitter 228R3. The leveling controller 236 controls the leveling actuator 226 in accordance with the received control signal to adjust the optical axis O to an angle corresponding to the current inclination angle $θp$ of the vehicle 300.

As shown in the curve line L1 of FIG. 4C, according to the sensor characteristics of the acceleration sensor 316, the more the inclination angle $θp$ of the vehicle 300 deviates from the inclination angle $0°$ in the first reference state, the larger the error E between the inclination angle derived using the first reference vector S1 and the actual inclination angle becomes. Also, the more the inclination angle $θp$ of the vehicle 300 deviates from the inclination angle $-a°$ in the second reference state, the larger the error E between the inclination angle derived using the second reference vector S2 and the actual inclination angle becomes (the curve line L2 of FIG. 4C). Further, the more the inclination angle $θp$ of the vehicle 300 deviates from the inclination angle in the third reference state, the larger the error E between the inclination angle derived using the third reference vector S3 and the actual inclination angle becomes (the curve line L3 of FIG. 4C).

Accordingly, to adjust the optical axis, the inclination angle $θp$ of the vehicle 300 is derived by using the reference vector that has the smallest angle with respect to the vector V being output from the acceleration sensor 316. That is, in accordance with the vector V being output from the acceleration sensor 316, the control unit 228R2 selects a reference vector according to which the error E between the calculated inclination angle and the actual inclination angle becomes the smallest, and using the selected reference vector, derives the inclination angle $θp$ of the vehicle 300 to carry out the optical axis adjustment. Therefore, as shown by a solid line in FIG. 4C, the acceleration sensor 316 has a sensor characteristic in which, when the inclination angle $θp$ of the vehicle 300 changes from $0°$ to $±(a/2°)$, the error E increases gradually, and when it changes from $±(a/2°)$ to $±a°$, the error E decreases. When it exceeds $±a°$, the error E increases again. That is, the acceleration sensor 316, when compared with the comparison example which carries out the auto leveling control using a single reference vector, has a sensor characteristic in which an increase in the error E between the calculated inclination angle and actual inclination angle is reduced. Therefore, according to the auto leveling control of this exemplary embodiment the adjustment accuracy of the optical axis position is improved as compared with the comparison example. Especially, when the inclination angle θp of the vehicle 300 is in the range of ±a°, it can carry out highly accurate auto leveling control.

As for the left headlamp 210L, the irradiation controller 228L, more specifically, the control unit 228L2 of the irradiation controller 228L may carry out similar control. Alternatively, one of the irradiation controllers 228L, 228R obtain the reference vectors in advance, and may derive the inclination angle of the vehicle using these reference vectors to generate a control signal, while the other may obtain the generated control signal to adjust the optical axis O.

As described above, the vehicle lamp system 200 according to this exemplary embodiment obtains the reference vectors to be output from the acceleration sensor 316 when the vehicle 300 takes orientations having different pitch angles and, using one of the reference vectors that has the smallest angle with respect to the current vector V being output from the acceleration sensor 316, derives the inclination angle of the vehicle 300. Based on the derived inclination angle of the vehicle 300, the optical axis adjustment is carried out. Therefore, the accuracy of the auto leveling control to execute the optical axis adjustment of the lamp unit 10 using the acceleration sensor 316 is improved as compared with the auto leveling control using a single reference vector.

Here, the above-mentioned vehicle lamp system 200 according to this exemplary embodiment is one aspect of the present invention. This vehicle lamp system 200 includes the lamp unit 10 capable of adjusting the optical axis, the acceleration sensor 316, and the irradiation controller 228L, 228R for controlling the lamp unit 10. The irradiation controllers 228L, 228R carries out the auto leveling control described above.

According to another aspect of the present invention, the irradiation controller 228L, 228R are provided as a vehicle lamp controller. The irradiation controller 228L, 228R includes the receiver 228L1, 228R1 configured to receive information on a vector output from the acceleration sensor 316, the control unit 228L2, 228R2 configured to execute the auto leveling control described above, and the transmitter 228L3, 228R3 configured to transmit control signals generated by the control unit 228L2, 228R2 to the leveling controller 236.

According to another aspect of the present invention, a vehicle lamp control method is provided. In this control method, the plurality of reference vectors to be output from the acceleration sensor 316 when the vehicle takes orientations having different pitch angles is provided. One of the reference vectors that has the smallest angle with respect to the vector V being currently output from the acceleration sensor 316 is used to derive the inclination angle θp of the vehicle 300 from the vector V being currently output from the acceleration sensor 316 and, based on the derived inclination angle θp of the vehicle 300, the optical axis O of the lamp unit 10 is adjusted.

While the present invention has been described with reference to certain exemplary embodiments thereof, the scope of the present invention is not limited to the exemplary embodiments described above, and it will be understood by those skilled in the art that various changes and modifications, including combinations of features of different exemplary embodiments described above, may be made therein without departing from the scope of the present invention as defined by the appended claims.

For example, the irradiation controller 228L, 228R may directly control the leveling actuator 226 (an optical axis adjustment portion), not through the leveling controller 236. That is, the irradiation controller 228L, 228R may also function as the leveling controller 236. Also, the generation of the control signal for instructing the optical axis adjustment may also be carried out by the vehicle controller 302. That is, the vehicle controller 302 may be configured as a vehicle lamp controller for executing the auto leveling control. In this case, the irradiation controllers 228L, 228R control the respective leveling actuator 226 in accordance with an instruction from the vehicle controller 302.

What is claimed is:

1. A vehicle lamp controller comprising:
a receiver configured to receive information on a detected vector from an output of an acceleration sensor;
a memory in which a plurality of reference vectors are stored, wherein the plurality of reference vectors corresponds to different pitch angles of a vehicle; and wherein at least one of the plurality of reference vectors is an orientation in three-dimensional space which corresponds to a pitch angle of the vehicle inclined with respect to a horizontal reference state of the vehicle, the at least one of the plurality of reference vectors including numerical values of respective axis components of a gravity acceleration vector in three axis directions;
a control unit configured to obtain a determined pitch angle of the vehicle from the detected vector and one of the reference vectors, and to generate a control signal for adjusting an optical axis of a vehicle lamp based on the determined pitch angle of the vehicle; and
a transmitter configured to transmit the control signal to an optical axis adjustment portion of the vehicle lamp;
wherein the control unit is configured to
calculate a difference angle between the detected vector and each of the reference vectors,
select the one of the reference vectors having a smallest angle of the difference angles,
derive, as the determined pitch angle of the vehicle, a sum of the smallest angle and a pitch angle of the vehicle corresponding to the selected reference vector.

2. The vehicle lamp controller according to claim 1, wherein the plurality of reference vectors includes a first vector to be detected from an output of the acceleration sensor when the vehicle is in a horizontal state, a second vector to be detected from an output of the acceleration sensor when the vehicle is inclined in an elevation angle direction from the horizontal state, and a third vector to be detected from an output of the acceleration sensor when the vehicle is inclined in a depression angle direction from the horizontal state.

3. A vehicle lamp system comprising:
a vehicle lamp having an adjustable optical axis;
an acceleration sensor; and
a vehicle lamp controller configured to control the vehicle lamp,
wherein the vehicle lamp controller comprises:
a receiver configured to receive information on a detected vector from an output of the acceleration sensor;
a memory in which a plurality of reference vectors are stored, wherein the plurality of reference vectors corresponds to different pitch angles of a vehicle, and wherein at least one of the plurality of reference vectors is an orientation in three-dimensional space which corresponds to a pitch angle of the vehicle inclined with respect to a horizontal reference state of the vehicle, the at least one of the plurality of reference vectors including numerical values of respective axis components of a gravity acceleration vector in three axis directions;

a control unit configured to obtain a determined pitch angle of the vehicle from the detected vector and one of the reference vectors, and to generate a control signal for adjusting the optical axis of the vehicle lamp based on the determined pitch angle of the vehicle; and a transmitter configured to transmit the control signal to an optical axis adjustment portion of the vehicle lamp;

wherein the control unit is configured to
calculate a difference angle between the detected vector and each of the reference vectors,
select the one of the reference vectors having a smallest angle of the difference angles,
derive, as the determined pitch angle of the vehicle, a sum of the smallest angle and a pitch angle of the vehicle corresponding to the selected reference vector.

4. A vehicle lamp control method comprising;
receiving information on a detected vector from an output of the acceleration sensor;
referring to a plurality of reference vectors corresponding to different pitch angles of a vehicle, wherein at least one of the plurality of reference vectors is an orientation in three-dimensional space which corresponds to a pitch angle of the vehicle inclined with respect to a horizontal reference state of the vehicle, the at least one of the plurality of reference vectors including numerical values of respective axis components of a gravity acceleration vector in three axis directions;

obtaining a determined pitch angle of the vehicle from the detected vector and one of the reference vectors; and adjusting an optical axis of a vehicle lamp based on the determined pitch angle;

wherein the obtaining comprises:
calculating a difference angle between the detected vector and each of the reference vectors,
selecting the one of the reference vectors having a smallest angle of the difference angles,
deriving, as the determined pitch angle of the vehicle, a sum of the smallest angle and a pitch angle of the vehicle corresponding to the selected reference vector.

5. The vehicle lamp controller of claim 1, wherein the acceleration sensor outputs vectors corresponding to orientations in three-dimensional space.

6. The vehicle lamp system of claim 3, wherein the acceleration sensor outputs vectors corresponding to orientations in three-dimensional space.

7. The vehicle lamp control method of claim 4, wherein the acceleration sensor outputs vectors corresponding to orientations in three-dimensional space.

* * * * *